United States Patent
Schinner et al.

(10) Patent No.: US 10,365,086 B2
(45) Date of Patent: Jul. 30, 2019

(54) METHOD AND SCANNER FOR TOUCH FREE DETERMINATION OF A POSITION AND 3-DIMENSIONAL SHAPE OF PRODUCTS ON A RUNNING SURFACE

(71) Applicant: Gerhard Schubert GmbH, Crailsheim (DE)

(72) Inventors: Karl-Ludwig Schinner, Dießen am Ammersee (DE); Abdelmalek Nasraoui, Crailsheim (DE)

(73) Assignee: Gerhard Schubert GmbH, Crailsheim (DE)

( * ) Notice: Subject to any disclaimer, the term of this patent is extended or adjusted under 35 U.S.C. 154(b) by 459 days.

(21) Appl. No.: 14/520,860

(22) Filed: Oct. 22, 2014

(65) Prior Publication Data

US 2015/0116461 A1    Apr. 30, 2015

(30) Foreign Application Priority Data

Oct. 25, 2013    (DE) .................. 10 2013 111 761

(51) Int. Cl.
*G01B 11/06* (2006.01)
*G01B 11/25* (2006.01)
*H04N 13/204* (2018.01)

(52) U.S. Cl.
CPC ...... *G01B 11/0691* (2013.01); *G01B 11/0608* (2013.01); *G01B 11/25* (2013.01); *H04N 13/204* (2018.05)

(58) Field of Classification Search
CPC ............ G01B 11/2545; G01B 11/2509; G01B 11/0691; G01B 11/0608
See application file for complete search history.

(56) References Cited

U.S. PATENT DOCUMENTS

| | | | |
|---|---|---|---|
| 5,986,745 A | 11/1999 | Hermary et al. | |
| 6,754,370 B1 | 6/2004 | Hall-Holt et al. | |
| 6,909,513 B1* | 6/2005 | Fujita ................... | G01B 11/245 12/142 R |
| 2002/0001029 A1* | 1/2002 | Abe ................... | G01B 11/2509 348/49 |
| 2002/0176059 A1 | 11/2002 | Lucey et al. | |
| 2004/0041028 A1 | 3/2004 | Smith et al. | |
| 2004/0222987 A1* | 11/2004 | Chang ................ | G01B 11/2509 345/419 |

(Continued)

FOREIGN PATENT DOCUMENTS

| | | |
|---|---|---|
| CA | 2375013 | 5/1996 |
| DE | 102007057771 | 7/2008 |
| DE | 102009015204 | 10/2010 |

OTHER PUBLICATIONS

European Patent Office, Search Report and Opinion for Application EP 14 189 219.0 (dated Mar. 10, 2015).*

(Continued)

*Primary Examiner* — David N Werner
(74) *Attorney, Agent, or Firm* — Head, Johnson, Kachigian & Wilkinson, PC

(57) ABSTRACT

Line scanning of a radiated and defined strip pattern (2) facilitates determining a position of an edge of each strip (5) by taking images of the line pattern (2) from a different viewing angle and determining an elevation profile along an image line (3) therefrom and by concatenating determining the 3-D elevation profile over a surface (1).

25 Claims, 5 Drawing Sheets

(56) References Cited

U.S. PATENT DOCUMENTS

Figure 1A:
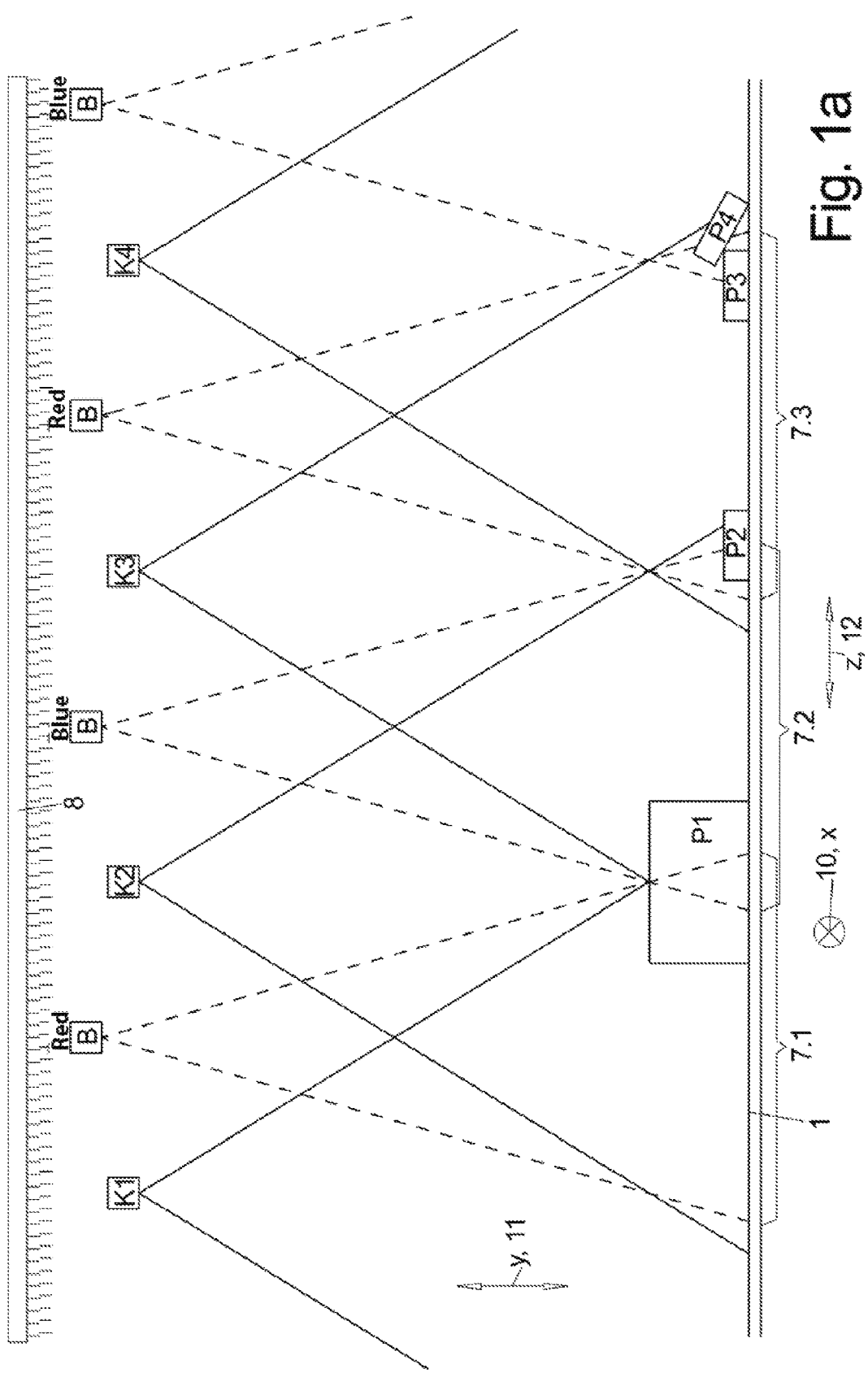

| | | | |
|---|---|---|---|
| 2004/0246473 A1 | 12/2004 | Hermary et al. | |
| 2007/0091174 A1* | 4/2007 | Kochi | G01B 11/2509 348/135 |
| 2007/0124949 A1* | 6/2007 | Burns, Jr. | G01B 11/2509 33/288 |
| 2008/0319704 A1* | 12/2008 | Forster | G01B 11/2509 702/150 |
| 2009/0059242 A1* | 3/2009 | Fujieda | G01B 11/0691 356/625 |
| 2009/0080036 A1 | 3/2009 | Paterson et al. | |
| 2010/0073689 A1* | 3/2010 | Schmitt | G01B 11/0691 356/630 |
| 2010/0319866 A1* | 12/2010 | Avikainen | D21G 9/0027 162/192 |
| 2011/0075156 A1 | 3/2011 | Patel et al. | |
| 2014/0118538 A1* | 5/2014 | Hoffmann | H04N 5/2256 348/136 |
| 2014/0267702 A1* | 9/2014 | Profitt | G01B 11/022 348/136 |

OTHER PUBLICATIONS

Datalogic Scanning Inc., "The Benefits of Omni-Directional Imaging Scanning Technology in Retail Point-of-Sale Applications" (2007).*

* cited by examiner

METHOD AND SCANNER FOR TOUCH FREE DETERMINATION OF A POSITION AND 3-DIMENSIONAL SHAPE OF PRODUCTS ON A RUNNING SURFACE

I. FIELD OF THE INVENTION

The invention relates to optical detection methods for determining a 3-dimensional shape.

II. BACKGROUND OF THE INVENTION

In many industrial fields, in particular in the field of packaging, a problem exists where products that are unevenly distributed on a running surface, e.g. a conveyor belt have to be detected with respect to their positions and optionally also with respect to their height, and additionally in top view of non-circular products also with respect to their rotational position and in top view of non-rotational symmetrical products, their geometrical shapes or surface features. Thus, robots arranged along the conveyor belts, so-called pickers can grip the products in a controlled manner, lift them up, and e.g. place them in a box in a controlled manner.

So far this was performed through an incident light line scanner that runs in lines transversal over the width of the surface wherein the line scanner takes line-shaped pictures in a tele-centric manner, thus, orthogonally directed onto the surface, wherein the pictures are sequentially arranged by the processing unit and generate a continuous image of the surface in view of the running speed of the surface in that the products have a different color than the surface itself so that the products and, thus, their positions can be detected. Thus, due to conveyor belt contamination a contrast between product and surface may not suffice any more for precisely locating the product.

This method, however, was not suitable as a matter of principle to determine an elevation, thus, a thickness of the object. When the surface of the product was problematic from an optical point of view, thus, glossy, reflective, little color-contrast relative to the base surface etc., this optical detection sometimes was not sufficient for position determination. In particular it did not suffice when the reflecting surface had oriented reflective characteristics, thus, like an aluminum foil or a metal surface.

This applies in particular for situations where flat products like for example cookies or elongated rod-shaped products can partially also rest on the surface on top of each other.

Thus, the contour may facilitate detecting that there is not only one object but two partially overlapping objects, but it is not always detectable which of the two respective objects is the lower object and which is the object that sits on top, and how tall it protrudes.

This information, however, is relevant for the subsequent pickers, so that a stack or pile of products can be disassembled by several pickers arranged in sequence starting with the uppermost product.

There certainly already are methods for detecting the 3-dimensional shape of products also on a running belt.

During stereoscopy two cameras take images of a scene from different viewing angles. It is then attempted to find textured brightness distributions in both pictures, wherein the brightness distributions are coincident and define an associated portion. Making these portions overlap (cross-correlation) facilitates determining a height of these portions from the linear movement that is required to produce coincidence, but this works only where a texture is provided. For all other areas, the height remains undefined.

During strip projection a defined strip pattern is radiated on and pictures are taken from another viewing angle. Triangulation facilitates detecting a position of each point in space in the strip pattern.

However, the pattern is ambivalent due to its repeat structure. However, in order to be able to simultaneously reach a large elevation range and a tight support point density (resolution) typically several patterns have to be projected onto the scene and scanned in sequence.

Therefore, the method is not suitable for moving scenes.

Furthermore, this method requires an environment that is as dark as possible and still apparent edges in the strips cannot always be differentiated from real object edges.

During shape from shading objects are radiated with different illuminations from different directions and the elevations of a scene can be determined from the resulting shading through complex algorithmic methods.

Strongly structured surfaces and finely structured surfaces are hardly detectable through this method, and surfaces with inferior optical properties, e.g. reflection are also hardly detectable.

Even when this method is applicable, it is hardly being used on an industrial scale due to its high level of complexity, but it is rather being used in the research, like e.g. in astronomy.

III. DETAILED DESCRIPTION OF THE INVENTION a) Technical Object

Thus, it is an object of the invention to provide a method for determining a position and 3-dimensional shape of products on a running surface, and a device suitable for the method.

b) Solution

This object is achieved through the features of the claims 1 and 19. Advantageous embodiments can be derived from the dependent claims.

The object is achieved by a method, wherein coordinates of a maximum number of points on the surface of the area on which the products are arranged are determined as follows.

In x-direction, the direction of the relative movement of the surface and the scanner, the position is known since the position of the line camera relative to the surface is known in this direction, for example in that the line camera is mounted at a defined, known and fixated position in x-direction above the surface, advantageously all at the same position in x-direction.

In y-direction, the transversal direction on the surface relative to the longitudinal direction the position is determined from the pattern that is at least uniquely encoded in sections in the y-direction, and radiated on in a defined direction and position, wherein the pattern is captured for example by a line camera along an image line extending in z-direction over the surface. The position of an edge of an optical marking of the pattern, in particular of each edge of each optical marking along the image line is known when the edge is radiated onto the surface which is defined as elevation=zero. This is the nominal position of the edge in Y-direction.

However, when the edge of the marking falls on a product and, thus, at an elevation grade zero this yields an actual position in Y-direction for the edge which actual position differs from the nominal position, wherein the deviating actual position is stored as actual position in Y-direction.

The elevation in Z-direction of this point is determined from an offset in Y-direction between the nominal position and the actual position which can be determined through trigonometry based on the known position of the camera in Y-direction and the elevation of the camera in Z-direction, and the known viewing angle of the camera relative to each of the uniquely encoded edges.

Thus, all three coordinates in space X, Y, Z are known for each intersection point of an edge of an optical marking with the image line.

Thus, an elevation profile can be generated along an image line initially. Due to the association of each image on the image line with a defined point in time during the relative movement, the image can be associated with a defined position in longitudinal direction (X-direction) along the moving surface and a 3-dimensional elevation profile of the entire surface including the products resting thereon can be generated from the individual image line elevation profiles.

From the 3-dimensional elevation profile it is not only evident where and in which position and optionally rotation position products are arranged on the surface, but also how and in which arrangement two or more products are arranged on top of one another entirely or partially and in which specific arrangement.

When strips that are arranged at a distance from one another and which are advantageously arranged parallel to one another are used for optical markings, processing is particularly simple. In particular, also the gaps that are provided between the strips can be used with respect to their number, arrangement, sequence, and width for optical processing like the strips themselves.

The resolution of the method, thus, depends from the maximum width of a strip or a gap.

The image line advantageously extends perpendicular to the extension of the strips which advantageously coincides with the longitudinal direction and the movement direction of the surface in order not to complicate processing unnecessarily.

For the same reason also the viewing direction in which the camera is oriented onto the surface is orthogonal to the surface.

The pattern that is optically radiated on is uniquely encoded at least in sections. This means that the entire pattern is either only made from one section in which the pattern is not repeated or it is made from plural sections of this type that are arranged behind one another, wherein advantageously also the transition of the pattern from one section to another has to have an encoding which does not coincide with any location within one of the sections.

Thus, there is a minimum section length which is defined by the number of markings which have to be viewed at any location within the pattern in order to be able to uniquely determine a position of the marking within a pattern.

The pattern that is optically radiated on is made respectively from strips and gaps with different widths, for example 700 strips respectively with 3 different widths, and is unique in the entire image area of the camera. The pattern is configured so that going from left to right through the pattern in increments strip by strip with a combination of for example 3 different strips and 3 different gaps, this specific 6 unit combination can only be found once in the entire pattern.

The length of a section, thus has to be large enough so that it is uniquely identified for the camera which section is being processed solely based on the position of the section within the viewing area either of the only provided camera or the plural provided cameras, for example due to the slant angle of the viewing direction in this section.

The included pattern can either have different portions in line direction within which the color of the radiated pattern is respectively identical, however, where the color from one portion to an adjacent portion alternates. These portions with different colors can be respectively radiated on by a projector or beamer which facilitates to radiate the pattern on not only by a single beamer or projector but by plural projectors or beamers that are arranged in sequence in line direction, and which still can be processed in a differentiated manner based on color.

Namely the overlap is selected so that adjacent portions with the different color of the pattern are still directly adjacent to one another also at the maximum detectable elevation, or overlap even slightly which has the effect that the portions and, thus the colors of the markings always overlap one another at all lower elevation levels, in particular at the elevation of the surface.

Within such single color portion of the radiated markings in turn several of the uniquely encoded sections of the pattern can be provided one after another.

When plural beamers that partially overlap with respect to their radiated portions, radiate the pattern in portions that are colored differently in an alternating manner the line capture can also be performed by plural line cameras which are then arranged along the line direction, respectively in a center between two projectors or beamers, and whose image area is either directly adjacent to or overlapping with the image area of the camera after the next at the maximum elevation level to be detected.

Thus, when each camera is capable of detecting the two colors of the markings of the adjacent beamers whose pattern are radiated into in their image areas, and is also capable of selecting according to color, only images with the color of the instant pattern can be used when processing the camera signals in each portion, and the remaining images of the markings with other colors can be discarded or used differently.

Since the portions overlap partially, this generates at least partially redundant information which improves the quality of the processing result.

Additionally, arranging plural beamers and cameras in an alternating pattern facilitates a modular configuration of the scanner depending on the width of the surface to be scanned.

Since the surface of the products and also the properties of the placement surface can have issues with respect to their optical properties (e.g. reflecting surfaces) punctiform light sources can be used in order to gain non-interfered image information for each image point from a respective non-blinded camera.

This applies in the same way for products that are arranged under transparent foils. This facilitates determining a height of products packaged in clear foils.

Furthermore, the images of the strip cameras can also be applied under additional illumination with are light, in particular mixed light, in particular with a LED-bar or another mixed light source, wherein the amount of radiated mixed light can be varied in increments and images can be taken at plural illumination levels.

Depending on whether the surfaces are reflective and how strongly reflective they are, certain illumination levels yield a better or inferior quality of the images. From plural available images the respective best image quality is then selected, optionally subdivided for individual portions along the light bar, thus, with the best suitable illumination level.

The movement of the surface relative to the scanner time off-set between the individual images is considered through processing computations, wherein the processing unit respectively also knows the speed of the relative movement.

In addition to the images with a radiated pattern, also color images along the image line of this surface portion without radiated patterns, so-called original images in black and white or in color can be produced by the cameras, in particular with an additional illumination using area light, in particular mixed light for example through a LED-bar or another mixed light source.

The computationally assembled, typically one line strip images then yield a strip image over the entire surface and the computationally assembled original images yield an entire color image or black and white image over the entire surface.

The 3-dimensional coordinates of each processed point on the surface that are determined from their strip images are primarily provided to the subsequent machines, for example a picking line, however, also the operator can generate either an original color image of the surface or the strip image of the surface or a gray scale image or a color scale image of the surface, for example on a monitor. Thus, the gray scales respectively correlate with a particular elevation and also in a color image, the color scales optionally respectively represent a particular elevation level.

Additionally, a matching of the images with the radiated pattern with the original images without radiated pattern leads to an improvement of the result, thus, the data from which pattern images are used. This is useful in particular when the products have deeply structured surfaces which deform the radiated pattern strongly enough so that a unique association of the captured pattern with the reference patterns is rendered more difficult.

Furthermore, undistorted 2-dimensional top view images of the position and rotational position of the products on the surface can be generated from the strip images and also from the original images or the combination of both solely through computation in the processing unit, wherein the images are respectively captured with a high viewing angle, in that a computational conversion is performed into telecentric top view images which exactly correspond to a view from above of each individual point.

The object is achieved by a device, wherein a projection device is arranged over the surface transversally, advantageously at a right angle to the movement direction, wherein the projection device is configured to radiate the pattern transversally over the surface wherein the pattern is uniquely encoded at least in sections and made from optically scanable markings. This projection device includes one or plural beamers or projectors that are offset in line direction, wherein the beamers or projectors are arranged as defined supra.

Furthermore, at least one or plural line cameras are provided in line direction, advantageously at the same longitudinal position relative to the surface, wherein the line cameras are capable of determining an actual position of each edge of the markings along the image line in line direction along an image line extending transversal to the markings. In case of plural offset projectors or beamers advantageously also plural line cameras are arranged which respectively view a section along the line and which are respectively arranged in a center between two projectors or beamers.

The viewing angles of the individual cameras are thus less slanted and the distortions of the markings, in particular of the strips are less compared to scanning with a single line camera which views the image line at a much higher slant angle at the edges or which would have to be arranged much higher above the surface which, however, is much more difficult to process due to the very small angular differences of the viewing angles to the individual edges of the optical markings.

The projection device and the camera together with a processing unit for image signals of the camera form the line scanner, in particular when they are arranged in a common housing.

The device can furthermore include a screen which is configured to represent the line images added up into strip patterns wherein the line images are put out in sequence by the line camera or also configured to put out the original color images added up in sequence or to represent the surface portions on the surface as a function of their elevation position in different color scales or gray scales.

EMBODIMENTS

Figure 1B:
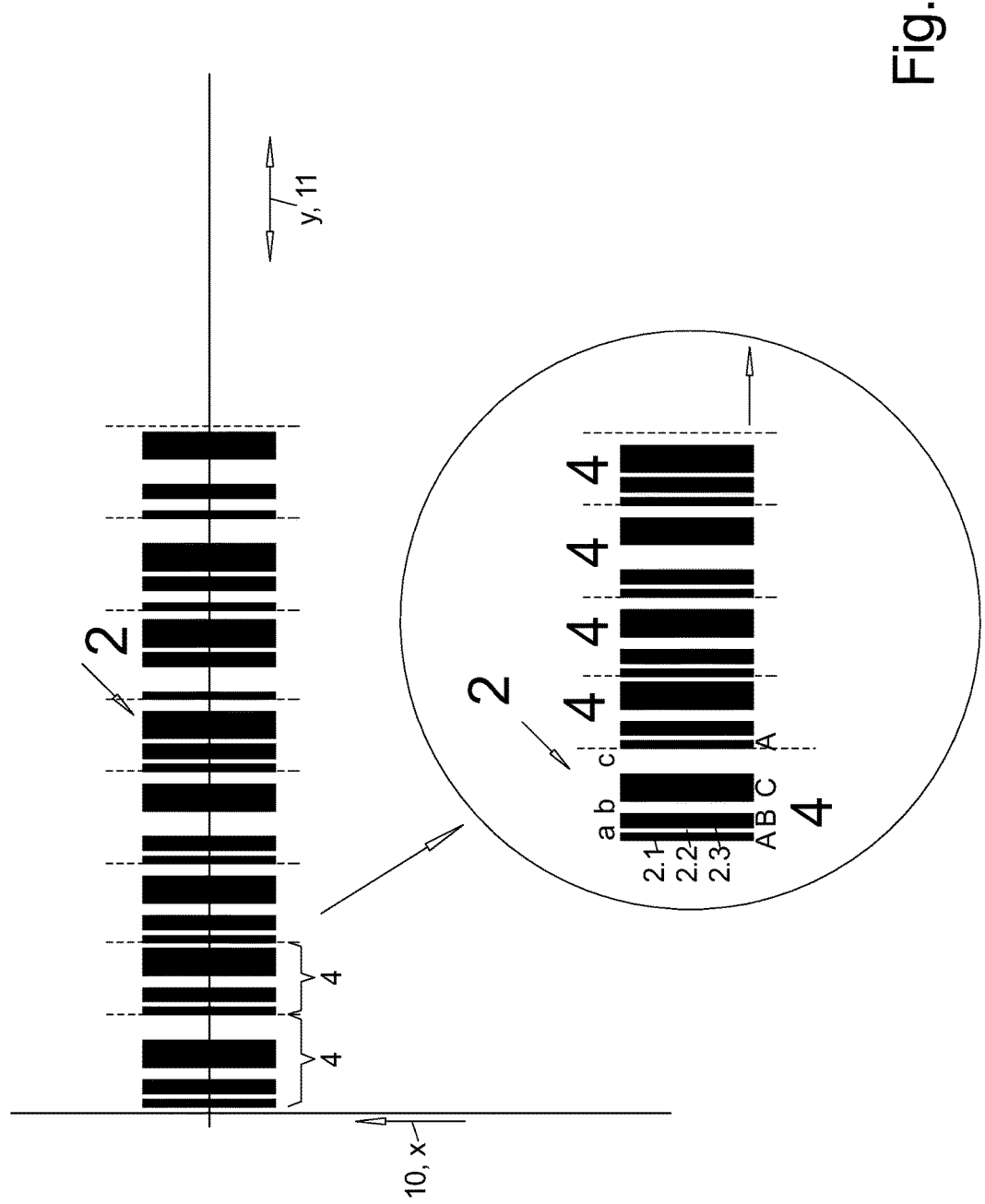
Figure 1C:
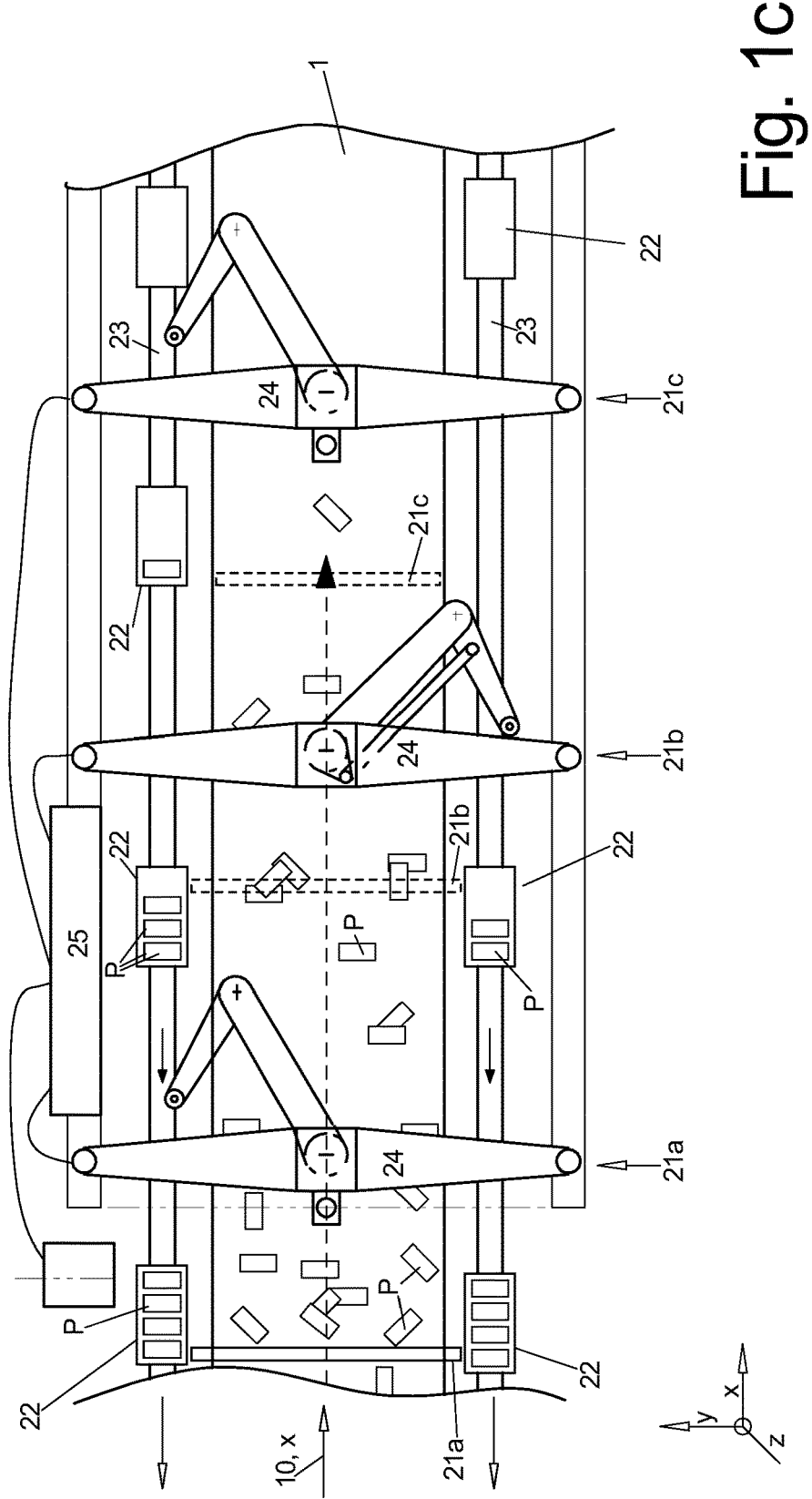
Figure 2:
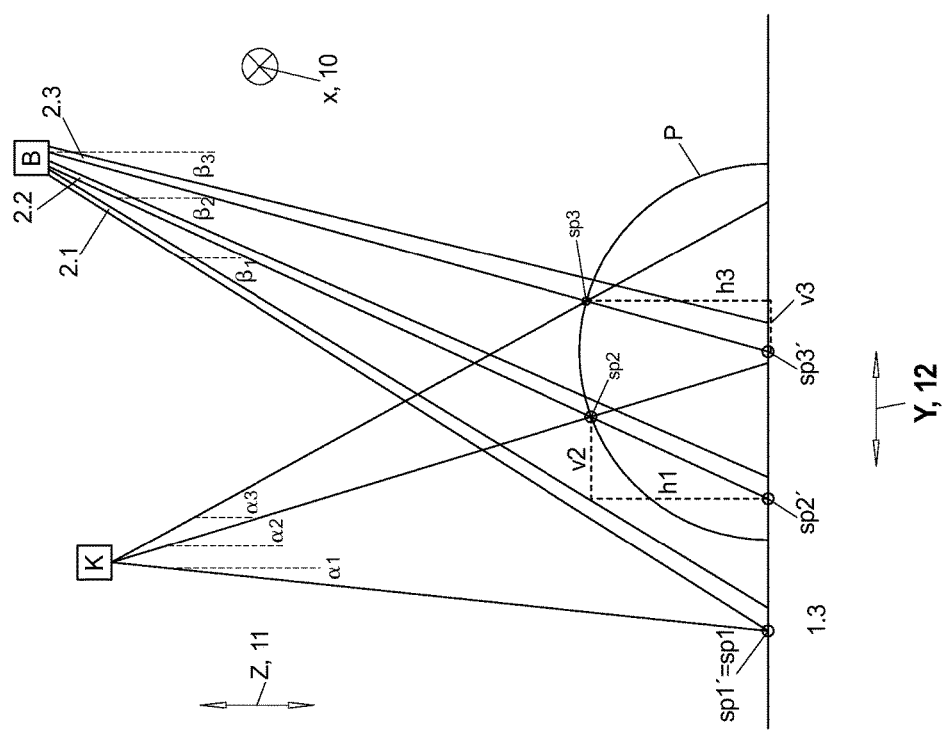
Figure 3A:
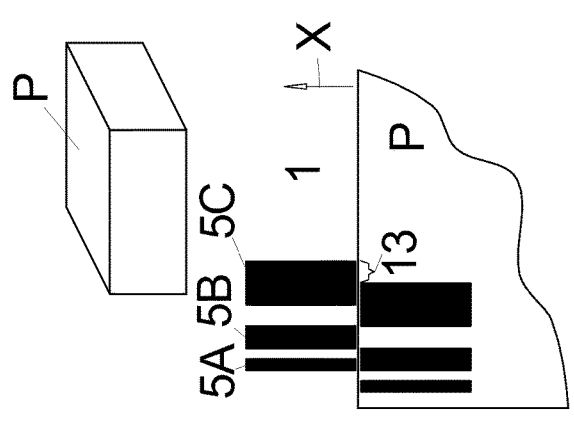
Figure 3B:
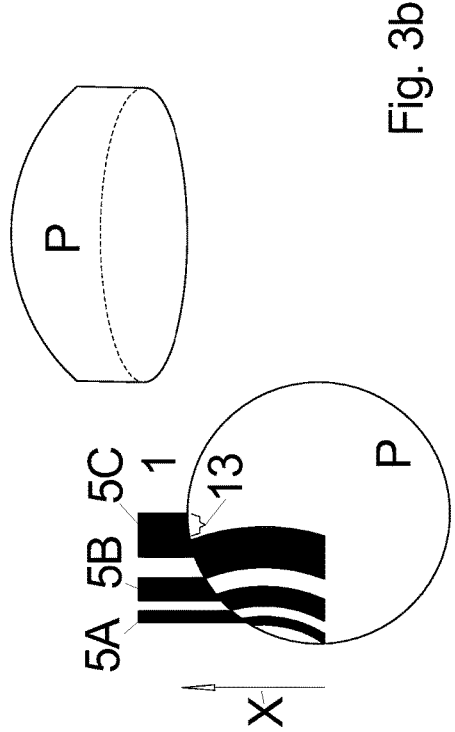

Embodiments according to the invention are subsequently described in more detail, wherein FIG. 1a: illustrates the scanner viewed in running direction of the surface;

FIG. 1b: illustrates a top view of the surface with a pattern radiated on;

FIG. 1c: illustrates a typical application of the device according to the invention;

FIG. 2: illustrates a detail of FIG. 1a with a differently shaped product;

FIG. 3a: illustrates a strip image of a vertical lateral surface of a product; and FIG. 3b: illustrates a strip image for a convex cambered product.

FIG. 1c illustrates a typical application for the line scanner 20 according to the invention.

This is a top view of a so-called picker line which delivers unevenly distributed products through a transport band 1 moving in running direction X, 10 wherein the products are individually gripped by pickers 21a, b, c arranged in sequence above the transport band 1 in operating direction, and wherein the products shall be precisely positioned in containers 22.

In this case, the containers are conveyed on both sides of the transport band 1 through a container band 23, in this case opposite to the running direction of the transport band 1 which, however, is not mandatory.

In this case, the pickers include a lower arm which is attached at an upper arm so that it is pivotable in a controlled manner about a vertical axis, and wherein the upper arm in turn is attached at a base so that it is pivotable about a vertical axis in a controlled manner. A suction device or another gripper for products is arranged at a free end of the lower arm so that it is adjustable in vertical direction.

This way the picker can reach and grip each product P that runs through its gripping range but the picker has to know in which position and in which rotational orientation the respective product P is at a particular point in time when moving along on the surface 1 below the picker.

Additionally, the products P, in particular when they are plate-shaped products like for example cookies, can also be partially arranged on top of one another. Then the scanner certainly also needs elevation information for the individual products in order to disassemble a stack and in order to grip the top product in a controlled manner to place it in the container 22, so that the next product thereunder can typically be detected by the next scanner and removed so that the stack can be disassembled.

The position for products P that are non-circular in top view also the rotation position and the elevation position of the products P is determined by at least one line scanner 21a extending transversal to the surface 1, wherein the line scanner is arranged in running direction of the transport band 1 upstream of the pickers, and data is forwarded to the control 25 which controls a movement of the pickers.

In order to facilitate taking down stacks of products that are arranged on top of one another or partially on top of one another, also plural scanners 21a, b, c can be provided that are offset in running direction of the transport band 1, wherein the scanners are advantageously arranged so that one respective scanner is in running direction upstream of one respective picker.

FIG. 1a illustrates a line scanner 21 in detail view in running direction 10 of the surface 1.

Thus, plural beamers B are provided that are arranged at identical distances from one another along the Y-direction, the line direction 12, wherein each beamer radiates a pattern 2 of sequential strips 5 that are parallel to one another with gaps 6 in between onto the surface 1 as illustrated in FIG. 1b.

The strips 2 extend in the direction 10, the moving direction of the surface 1. The beamers B are thus offset from one another in line direction Y, so that their radiation portions contact or even overlap at least at the maximum elevation to be scanned, thus e.g. on the surface of the product P1 taking into account a radiation impact angle β of their radiation portions, thus the radiation portions always overlap at lower elevations. In this overlapping portion red and blue components of the pattern, in particular strips are radiated on mixed together.

Two adjacent beamers B radiate their patterns 2 in different colors, wherein beamers with the colors red and blue respectively alternate in sequence.

On the surface 1 plural products P1 through P4 are illustrated that need to be scanned with respect to position and rotational orientation, wherein the product P1 shall have a height which shall correspond to the maximum elevation to be scanned above the surface 1.

One of the line cameras K1 through K4 is respectively arranged in a center between two adjacent beamers B, wherein the line camera takes snap shots only of a respective portion of the image line 3, in transversal direction the strips 2 as illustrated in FIG. 1b in top view.

The cameras K1 through K4 are arranged with respect to their height above the surface 1 and in consideration of their viewing angle α so that at least at the maximum elevation to be scanned, thus for example at the elevation of the top side of the product P1 the viewing portions of a line camera K1 at least touch a viewing portion of a line camera K3 that is arranged downstream of the next line camera or optionally also overlap so that they always overlap in lower elevations.

The viewing portions of the cameras K1 through K4 thus overlap by more than 50% so that completely redundant scanning is provided along the image line 3.

The cameras K1 through K4 can detect all colors radiated by the beamers B and can take photos of the colors, the connective processing unit, however, can only select according to the individual colors of the beamers.

The position of the image line 3 in X-direction to be scanned by the cameras K1 through K4 as well as the position of the individual beamers B and the line cameras K1 through K4 with respect to their elevation as well as their position in line direction 12 and also the respective viewing angles α of the line cameras as well as the radiation impact angle β of the beamers are known.

The determination of the position and orientation of the individual products P1 through P4 on the surface 1 can then be performed as follows.

A position in line direction 12 and also an elevation in Z-direction 11 has to be determined for as many points of the surface 1 or the surface of a product P1, P2 placed thereon as possible as illustrated in FIG. 2.

The position in X-direction is provided from the fixed positioning of the scanner 21 and thus of the image line 3 and from the known movement velocity of the surface 1 for each line image.

In FIG. 1b several strips 5 are illustrated in an exemplary manner from the strip pattern 2 which is radiated by the beamer B.

As a matter of principle the edges are always examined, thus beginning and end in line direction 12 of the optical markings 2.1, 2.2, and 2.3, thus of the strips 5 A, B, C and of the gaps 6a, b, c between the strips 5 A, B, C, thus the transitions of strips 5 to gaps 6 at an intersection point with the image line 3 along which FIG. 2 is sectioned.

Out of the illustrated strips 5 the front edge and the rear edge are known with respect to their position in Y-direction 12 on the surface 1 which is defined by the known position of the beamer B in Y-direction, its elevation above the surface 1 and the beam output angle β1, β2 of the light beam from the beamer B, which light beam forms this edge. The position of the camera K capturing the line image 3 in Y-direction is also known and also its elevation in Z-direction above the surface as well as the viewing angle α1, α2, α3 of each individual camera pixel in a direction of the image line 3.

Thus, for the strip 5A the nominal position SP1' is known for its front edge from the data of the beamer B, wherein the nominal position is provided when the front edge of the strip 5a impacts the surface 1 itself.

For the camera K which takes a picture of this front edge an actual position SP1 is known in Y-direction.

Since the nominal position SP1' is identical with the actual position SP1 for the front edge of the strip 5A, is fair to draw the conclusion that this front edge is on the surface 1 and not elevated on a product P.

Thus, a different value is obtained in the Y-direction between the nominal position SP2' and the actual position SP2 for the front edge of the strip 5B in line direction Y. The offset V2 that is provided there between corresponds to a particular elevation $h_1$ which can be automatically computed optionally from the position of the camera K in consideration of the viewing angle α2 of the camera pixel or from the position of the beamer B in consideration of the beam impact angle β2 for the front edge of the strip 5A.

The same applies for all edges of the strips which are located on the surface of the product P, for example for the front edge of the light strip 5C.

As illustrated in FIG. 1b three different strips 5A, B, C are provided in embodiment 2 as illustrated in FIG. 1b, wherein the strips have different widths, namely for example strip 5B is twice as wide as strip 5A and strip 5C is three times as wide as strip 5A.

By the same token three different gaps 6a, b, c are provided with different widths, namely gap 6b is twice as wide as gap 6a and gap 6c is three times as wide as gap 6a.

Now, changing a width of a respective strip or of a respective gap starting with a group of three strips and three gaps AaBbCc and then going from group to group and performing the change at another position in the group, it is assured that viewing a minimum section length 4 of six sequential markings at any location within the uniquely coded section, the position of each marking along the image line 3 and thus, also each of edge of a marking within the section can be determined.

Additionally, in practical applications the right half of the product P, in particular the right lower edge portion of the product P which is not visible any more to the illustrated camera K is scanned by an additional camera that is provided to the right of the illustrated beamer B, and which is not illustrated.

This way the surface contour of the product P is determined for a plurality of points along the image line 3 and since this additionally defines where the beginning and the end of the surface contour of the product P terminates on the image line 3 also the position of the product P in Y-direction is determined.

By concatenating sequential line images on the moving surface 1 a position and rotational orientation and also elevation of individual points becomes determinable for all products.

FIG. 3a illustrates which strip image results from a plurality of concatenated strip image line pictures of the moving surface 1 when a circumferential contour of a for example cuboid product P is captured which contour is arranged exactly at a right angle to the movement direction 10 of the surface 1 and which includes exactly vertically oriented side surfaces.

The individual partial strips 5A, B, C of embodiment 2 then have an offset 13 from one another at the circumferential contour wherein the offset corresponds to the height of the cuboid product P, but the individual partial strips are straight in the portion of the surface of the product P since the surface of the product P is level, thus parallel to the surface 1, thus also in the portion of the surface 1 itself.

FIG. 3b illustrates the resulting strip image for a product P with a convex cambered surface and a low, vertically oriented edge of the product P.

In the portion of the circumferential contour of the product P this yields a strip image in which the partial strips of a strip 5 A, B, C have an offset 13 from one another corresponding to the height of the vertical edge of the product P.

In addition the partial strips which are projected directly onto the surface 1 still extend straight, whereas the partial strips that are radiated onto the convex cambered surface of the product P are curved.

REFERENCE NUMEROS AND DESIGNATIONS

1 Surface, Transport Band
2 Pattern
2.1, 2.2 Marking
3 Image Line
4 Minimum Section
5A, B, C Strip
6a, b, c Gap
7 Portion
8 LED strip
9
10, X Longitudinal Direction, Operational Direction
11, Z Height Direction, Viewing Direction
12, Y Line Direction
13 Offset
20 Scanner, Line Scanner
21a, b, c Picker
22 Container
23 Container Band
24 Base
25 Control
B Beamer
h2, h3 Elevation Value
K, K1 Camera
$P_1$-$P_4$ Product
SP1-SP3 Actual Position
SP1'-SP3' Nominal Position
V2, V3 Offset

The invention claimed is:

1. A method for touch-free determination of a position and 3-dimensional shape of products (P1, P2) on a surface (1) extending in longitudinal direction (10, X), wherein
  a line scanner (20) is arranged at least partly above the surface (1), wherein the line scanner (20) comprises at least three line cameras (K, K1, K2) and at least two projectors or beamers (B) with one of said line cameras (K1) arranged in a line direction (12, Y) between two adjacent projectors or beamers (B), wherein the line scanner (20) is arranged such that the line direction extends transversally to the longitudinal direction (10, X),
  a pattern (2) that is uniquely coded at least in sections and includes optically scanable markings (2.1, 2.2, 2.3) is radiated by the at least two beams (B) in a defined manner along the line direction (12, Y) extending transversally to the longitudinal direction (10, X) over the surface (1) with the products (P1, P2) at least temporarily,
  an image line (3) extending transversal to the markings in the portion of the markings (2.1, 2.2, 2.3) and an actual position (SP1, SP2) of edges of the markings (2.1, 2.2, 2.3) on the image line (3) is captured by the at least three line cameras (K, K1, K2), arranged along line direction (12, Y),
  an offset (V1, V2) of the edge in line direction (12, Y) is determined from a known nominal position (SP1', SP2') of the edge in line direction (12, Y) and its actual position (SP1, SP2) and converted into an elevation value (h2, h3),
  an image-line-elevation profile is determined from the elevation values (h2, h3) of all image-line-points,
  the preceding steps are repeated after a relative movement of the surface (1) in longitudinal direction (10, X) and transversally to line direction (12, Y) on the one side with respect to the markings (2.1, 2.2, 2.3) and on the other side with respect to the image line (3);
  a three-dimensional elevation profile of the surface (1) including the products (P1, P2) placed thereon is generated from directly sequential image-line-elevation profiles without gaps between each other so that profiles are generated for multiple products in the line direction (12, Y);
  the uniquely encoded pattern (2) has portions (7.1, 7.2, 7.3) in line direction (12, Y) in which portions a color of the pattern (2), thus of the markings (2.1, 2.2, 2.3) within a portion (7.1, 7.2, 7.3) remains identical, but two adjacent portions (7.1, 7.2, 7.3) have different colors and are created by radiation from two different of said projectors or beamers (B) of different color, wherein each projector or beamer (B) respectively radiates a portion (7.1, 7.2, 7.3); and
  an image portion of each camera (K, K1, K2) is selected so that the image portions of the camera (K) are overlapping in line direction (12, Y) with an image portion of the second next camera (K2) on the surface of the maximum elevation of each of the products (P1, P2) to be detected, wherein said image portion of each camera (K, K1, K2) is selected so that it extends at least beyond a point on the surface (1), that is directly beneath the next camera (K, K1, K2).

2. The method according to claim 1, characterized in that strips (5) arranged with gaps (6) between each other are used as optical markings (2.1, 2.2, 2.3), in particular strips (5) that extend parallel to one another.

3. The method according to claim 2, characterized in that the image line (3) extends perpendicular to the extension (10, X) of the strips (5).

4. The method according to claim 1, characterized in that the viewing direction (11, Z) of the camera (K1, K2) is orthogonal to the surface (1).

5. The method according to claim 1, characterized in that the actual position (SP1, SP2) of each edge of each marking (2.1, 2.2, 2.3) on the image line (3) is captured.

6. The method according to claim 1, characterized in that the patterns (2) that are uniquely encoded at least in sections are selected so that a position in a minimum section (4) is uniquely determinable within the minimum section (4) with a defined number of markings (2.1, 2.2, 2.3) wherein the minimum section (4) is random selectable within the pattern (2), and
so that an encoding is also provided at a transition from a minimum section (4) to another, wherein the encoding does not coincide with any location within one of the minimum sections (4).

7. The method according to claim 6, characterized in that plural minimum sections (4) of the uniquely encoded pattern (2) are provided behind one another in line direction (12, Y) within a portion (7.1, 7.2, 7.3).

8. The method according to claim 1, characterized in that the pattern (2) is applied by plural projectors or beamers (B), wherein each projector or beamer (B) respectively radiates a portion (7.1, 7.2, 7.3).

9. The method according to claim 8, characterized in that radiating the portions with their patterns is performed so that on the surface of the highest product (P1, P2) to be detected a last marking of the one portion directly follows a first marking of the adjacent portion or the portions (7.1, 7.2, 7.3) slightly overlap at this location.

10. The method according to claim 1, characterized in that each camera (K, K1, K2) is configured to detect at least the two colors of the markings of the two adjacent beamers (B) whose pattern (2) is radiated in their image portion.

11. The method according to claim 10, characterized in that only images are used when processing camera signals in each portion (7.1, 7.2, 7.3) which images have the color of the pattern (2) provided in the respective portion and the remaining images with other colors are discarded or used in another manner.

12. The method according to claim 11, characterized in that the cameras (K, K1, K2) are used in sequence, in particular in an alternating manner to generate original color images of the image line (3) and images of the patterns (2) along the image line (3) and in particular a speed of a movement of the surface (1) relative to the markings (2.1, 2.2, 2.3) and relative to the image line is selected relative to a time lapse between the images so that a sum of the original color images yields a complete coherent color image of the surface (1) and the summed up strip images of the image line (3) generate a continuous strip image of the surface (1).

13. The method according to claim 12, characterized in that the strip images and/or the original color images are being repeated additionally with a mixed light source switched on, in particular a LED-bar (8) along the line direction (12, Y) wherein the mixed light source provides additional irradiation of the surface (1), in particular the additional illumination is added in plural increments.

14. The method according to claim 13, characterized in that in portions (7) or sections (4) where a camera (K1) does not produce a useable result an image of an adjacent camera (K2) is processed for the respective portion (7) or section (4).

15. The method according to claim 14, characterized in that the sample images are compared with the original images without a pattern radiated on in order to improve data from the sample images.

16. The method according to claim 12, characterized in that tele-centric two-dimensional images are generated from the strip images and the original images of at least one camera (K, K1, K2) through computation, wherein the tele-centric two-dimensional images reflect an exact undistorted position and rotational orientation of the products (P1, P2) on the surface (1).

17. The method according to claim 1, characterized in that at least five line cameras (K, K1, K2, K3, K4) are arranged along line direction (12, Y) one after another, wherein the image portion of at least one (K2) of the at least five line cameras extends such that it respectively extends to at least four points of the surface (1), that are respectively directly beneath four other cameras (K, K1, K3, K4) of the at least five line cameras.

18. The method according to claim 1, characterized in that at least five line cameras (K, K1, K2, K3, K4) are arranged along line direction (12, Y) one after another with a constant distance between each camera and the next camera along the line, wherein the image portion of at least one (K2) of the at least five line cameras extends along line direction (12, Y) over a distance longer than two times said constant distance.

19. A line scanner (20) for touch-free determination of a position and a three-dimensional shape of products (P1, P2) on a surface (1) extending in a longitudinal direction (10, X), comprising:
at least one projection device including at least two beamers (B) or projectors wherein the projection device is configured to radiate a pattern (2) along a line direction (12, Y) extending transversally to the longitudinal direction (10, X) that is uniquely coded in sections and includes optically scanable markings (2.1, 2.2, 2.3), wherein the pattern is radiated transversally over a surface (1);
a line scanner (20) having at least three line cameras (K, K1, K2) which are arranged along line direction (12, Y) and which are configured to determine an actual position (SP1, SP2) of an edge of the markings (2.1, 2.2, 2.3) in line direction (12, Y) along the image line (3) extending transversal to the markings (2.1, 2.2, 2.3);

wherein the projection device and the line cameras (K, K1, K2) are moveable relative to the surface (1) in the longitudinal direction (10, X) and wherein the surface (1) is movable relative and transversally to line direction (12,Y); and a central processing unit (CPU) configured to compute an offset (V2, V3) of an edge in line direction (12, Y) between a nominal position (SP1', SP2') of the edge and an actual position (SP1, SP2) of the edge into an elevation value (h2, h3) in elevation direction (11, Z) and to store the elevation value together with an Y-value and an X-value, wherein the pattern (2) has portions (7.1, 7.2, 7.3) in line direction (12, Y) in which portions a color of the pattern (2), thus of the markings (2.1, 2.2, 2.3) within a portion (7.1, 7.2, 7.3) remains identical, but two adjacent portions (7.1, 7.2, 7.3) have different colors and are created by radiation from two different projectors or beamers (B) of different color, wherein each projector or beamer (B) respectively radiates a portion (7.1, 7.2, 7.3); and wherein an image portion of each camera (K, K1, K2) is selected so that the image portions of the camera (K) are overlapping in line direction (12, Y) with an image portion of the second next camera (K2) on the surface of the maximum elevation of each of the products (P1, P2) to be detected, wherein said image portion of each camera (K, K1, K2) is selected so that it extends at least beyond a point on the surface (1), that is directly beneath the next camera (K, K1, K2), so that a three dimensional profile is generated for multiple products (P1, P2) in the line direction (12,Y).

20. The device according to claim 19, characterized in that the device comprises a screen that is configured to put out line images as a summed up sample representation, wherein the line images are previously sequentially put out by the line camera (K, K1, K2), or wherein the screen is configured to represent surface portions of the surface (1) as a function of their elevation in various color scales, e.g. color scales or gray scales.

21. The device according to claim 19, characterized in that the device includes plural projection devices and plural line cameras (K, K1, K2) which are respectively jointly arranged at different positions in the longitudinal direction (10, X) of the surface (1).

22. The device according to claim 19, characterized in that at least five line cameras (K, K1, K2, K3, K4) are arranged along line direction (12, Y) one after another, wherein the image portion of at least one (K2) of the at least five line cameras extends such that it respectively extends into the image portions of four other cameras (K, K1, K3, K4) of the at least five line cameras.

23. The device according to claim 19, characterized in that at least five line cameras (K, K1, K2, K3, K4) are arranged along line direction (12, Y) one after another with a constant distance between each camera and the next camera along the line, wherein the image portion of at least one (K2) of the at least five line cameras extends along line direction (12, Y) over a distance longer than two times said constant distance.

24. The device according to claim 19, characterized in that the processing unit is configured such that it can select portions according to individual colors.

25. The device according to claim 19, characterized in that the processing unit is configured such that it can only select portions according to individual colors.

* * * * *